United States Patent
Nakagawa et al.

(10) Patent No.: US 6,739,389 B2
(45) Date of Patent: May 25, 2004

(54) WASTE HEAT RECOVERING APPARATUS FOR AN ENGINE

(75) Inventors: Yoshinori Nakagawa, Saitama (JP); Keiichirou Bungo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 126 days.

(21) Appl. No.: 10/151,180

(22) Filed: May 21, 2002

(65) Prior Publication Data

US 2003/0006032 A1 Jan. 9, 2003

(30) Foreign Application Priority Data

Jul. 3, 2001 (JP) ..................................... P2001-202162

(51) Int. Cl.[7] .............................. G05D 23/00; F01P 7/00
(52) U.S. Cl. ........................ 165/293; 165/288; 165/51; 165/11.1
(58) Field of Search ............................ 165/41, 51, 202, 165/253, 288, 289, 293, 11.1

(56) References Cited

U.S. PATENT DOCUMENTS

| | | | | |
|---|---|---|---|---|
| 4,637,454 A | * | 1/1987 | Lowes ..................... | 165/253 X |
| 5,237,338 A | * | 8/1993 | Stephenson ............. | 165/293 X |
| 5,960,857 A | * | 10/1999 | Oswalt et al. ............. | 65/293 X |
| 5,971,068 A | * | 10/1999 | Ochiai et al. ........... | 165/253 X |
| 6,089,310 A | * | 7/2000 | Toth et al. ................. | 165/11.1 |
| 6,213,199 B1 | * | 4/2001 | Al-Khateeb ............. | 165/253 X |
| 6,305,170 B1 | | 10/2001 | Kitani et al. ................... | 60/614 |
| 6,367,260 B1 | | 4/2002 | Kasai et al. ................... | 60/648 |

FOREIGN PATENT DOCUMENTS

| | | |
|---|---|---|
| EP | 1 045 127 A2 | 10/2000 |
| EP | 1 094 214 A2 | 4/2001 |
| JP | 60224959 | 11/1985 |
| JP | 01155021 | 6/1989 |
| JP | 01280620 | 11/1989 |
| JP | 7-247834 | 9/1995 |
| JP | 07247835 | 9/1995 |

* cited by examiner

*Primary Examiner*—Ljiljana V Ciric
(74) *Attorney, Agent, or Firm*—Westerman, Hattori, Daniels & Adrian, LLP

(57) ABSTRACT

The absence or shortage of a heat transfer medium can be detected without any time lag. While the medium is circulated through a water jacket and an exhaust gas heat exchanger which receives heat from the exhaust gas, heat generated by the engine can be recovered. A first sensor is provided at a waste heat recovering location in a circulation path of the medium. A second sensor is provided at a downstream side of sensor. When the medium is absent, a difference in measured temperature develops between sensor and sensor. A heat transfer medium shortage signal is outputted when the difference in the measured temperature between the first sensor and the second sensor exceeds a predetermined reference level.

4 Claims, 8 Drawing Sheets

WASTE HEAT RECOVERING APPARATUS FOR AN ENGINE

BACKGROUND OF THE INVENTION

1. Field of the Invention

The present invention relates to a waste heat recovering apparatus for an engine and particularly to an engine waste heat recovering apparatus arranged for use as a power source in such as a cogeneration system.

2. Description of the Related Art

In view of promotion of the global environmental protection, cogeneration systems have been focused which recovers (exhaust) heat generated by the operation of a heat source and utilizes its energy. For example, a cogeneration system has a gas engine which is provided as the power source and fueled with city gas for generation of electricity and supply of hot water. The cogeneration system also has a waste heat recovering apparatus arranged in which a heat transfer medium such as water is circulated by the action of a water pump through a water jacket for cooling the engine and an exhaust gas heat exchanger for recovering heat from the exhaust gas of the gas engine. More specifically, thermal energy (output) can be produced by transferring the heat from the heat transfer medium which has been heated up by the exhaust gas.

However, if the waste heat recovering apparatus fails to feed its heat transfer medium circulation conduit with a proper amount of the heat transfer medium, the temperature may soar at the heat source or engine and its adjacent area thus creating defectives of the component next to the engine. For instance, shortage of the heat transfer medium is caused by improper replenishment at the maintenance or initial setting, leakage due to the occurrence of failure, or mixture of the air. A modification of the waste heat recovering apparatus is known where an engine protecting circuit is actuated when the temperature of the cooling water rises up to an upper limit level. Such a modification is disclosed in Japanese Patent Laid-open Publication (Heisei)7-247834 where the cooling water fed into the engine cooling section is controlled to stay in a predetermined range of the temperature and minimize the actuation of the engine protecting circuit.

The conventional waste heat recovering apparatus equipped with the engine protecting circuit has a sensor which is provided adjacent to the heat source in the circulation conduit of the cooling water and also used for detecting the occurrence of a fault when its measured temperature exceeds a predetermined threshold level. However, as there is a time lag from the actual increase in the temperature to the measurement of the increased temperature by the sensor, the action of thermal protection may hardly be adequate. It is also necessary to set the predetermined threshold temperature for detecting the occurrence of a fault to a level higher than the upper limit of the heat transfer medium.

SUMMARY OF THE INVENTION

An object of the present invention is to provide a waste heat recovering apparatus for an engine which can detect the circulation of an insufficient amount of the heat transfer medium at the earliest possible time to ensure the protection of any heat exposed component.

As a first feature of the present invention, a waste heat recovering apparatus for recovering the waste heat of an engine by circulating a liquid heat transfer medium through a water jacket to cool the engine is provided comprising: a first temperature sensor provided at a waste heat recovering location across the circulation path of the heat transfer medium; a second temperature sensor provided at a downstream of the first temperature sensor across the circulation path; and a means for providing a heat transfer medium shortage signal when a difference in the temperature measurement between the first temperature sensor and the second temperature sensor is greater than a predetermined reference level. As a second feature of the present invention, the waste heat recovering apparatus may be modified in which the heat transfer medium is further conveyed to an exhaust gas heat exchanger which receives heat from the exhaust gas of the engine.

The first and second features allow the heat to be conducted through the air between the first sensor and the second sensor when the heat transfer medium is absent in the circulation path. Accordingly, the difference in the temperature measurement between the two temperature sensors will be greater than that with a sufficient amount of the heat transfer medium circulated in the circulation path. As a result, absence or shortage of the heat transfer medium can favorably be detected by examining whether or not the difference in the temperature measurement exceeds the reference level.

As third feature of the present invention, the waste heat recovering apparatus may be modified in which at least either the first temperature sensor or the second temperature sensor is placed at a location where the air easily stands still in the circulation path. Even if the shortage of the heat transfer medium is small, a mass of the air having a small level of the thermal conductivity is developed between the two temperature sensors because one of the two sensors is located where the air easily stands still. Accordingly, the shortage of the heat transfer medium under progression can be detected at its early stage from the difference in the temperature measurement between the two temperature sensors.

As a fourth feature of the present invention, the waste heat recovering apparatus may be modified in which the first and second temperature sensors are a couple of temperature sensors provided in a fail-safe system. The fourth feature allows the two temperature sensors provide for the fail-safe function to serve as the first and second temperature sensors. Accordingly, the presence, absence, or shortage of the heat transfer medium can favorably be detected with no use of extra sensors.

DETAILED DESCRIPTION OF THE PREFERRED EMBODIMENTS

Figure 1:
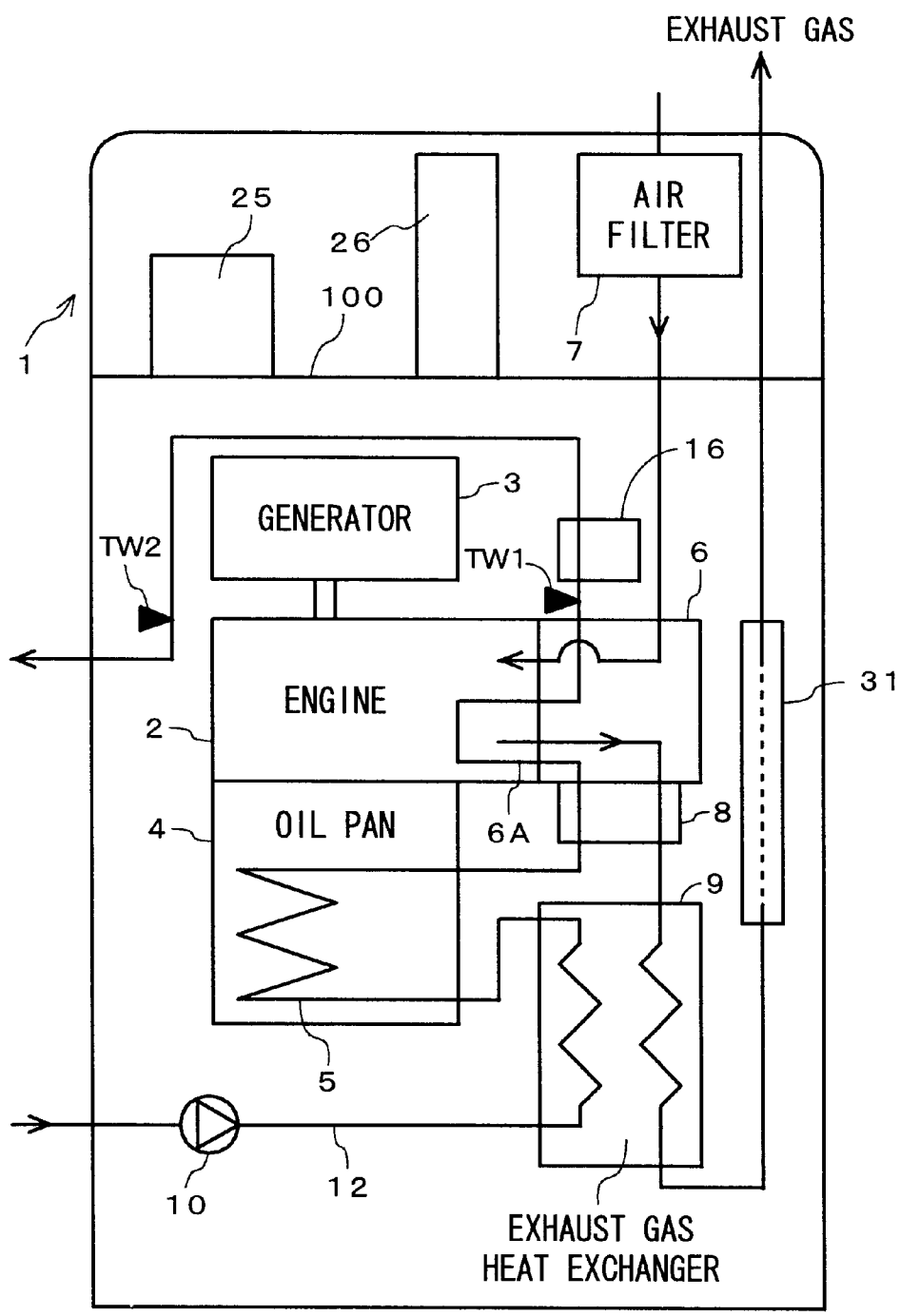
FIG. 1 is a block diagram showing a primary part of an engine waste heat recovering apparatus according to an embodiment of the present invention.

An embodiment of the present invention will be described in more detail referring the relevant drawings. FIG. 1 is a block diagram showing an arrangement of an engine waste heat recovering apparatus related to the embodiment of the present invention. An engine waste heat recovering apparatus 1 recovers heat from the engine of an engine generator. The engine waste heat recovering apparatus 1 has a space which is divided into upper and lower rooms by a dividing board 100. An air circulation between the two rooms in cut off by the dividing board 100. An engine 2 and a generator 3 which is connected mechanically and is driven by the engine 2 are installed in the lower room. The generator 3 is driven by the engine 2 to generates alternating current. The engine 2 has an oil pan 4 for storage of lubrication oil. The oil pan 4 includes an oil cooler (an oil heat exchanger) 5 which carries out heat exchange between the oil in the oil pan 4 and the heat transfer medium (a cooling water).

An air filter 7, and a battery 25 and ECU (engine control unit) 26 are installed in the upper room where the influence of the heat from the engine 2 is controlled small by isolating the lower room in which the engine 2 is accommodated. Air which is flown through the air filter 7 is induced to a cylinder heat of the engine 2. The exhaust gas form the engine 2 is passed through an exhaust manifold 8 and an exhaust heat exchanger 9 and discharged out from a silencer 31.

For recovering heat generated by the engine 2 at high efficiency, a circulating path 12 for the heat transfer medium is provided. A water pump 10 is mounted at the inlet of the circulating path 12 for circulating the heat transfer medium. This permits the water pump 10 not to meet a high temperature of the heat transfer medium, hence avoiding abrupt degradation of the sealant or the like and increasing the operational life of the water pump 10.

The heat transfer medium pumped by the water pump 10 is conveyed to the exhaust gas heat exchanger 9, and then is conveyed through the oil heat exchanger 5 in the oil pan 4, the engine 2, the cylinder head 6, and a thermo-cover 16 and output exteriorly. The heat transfer medium which has passed through the circulating path can pass the thermal load such as a hot water supply tank disposed exterior of the waste heat recovering apparatus. The thermo-cover 16 has a thermostat built therein for closing a valve when the temperature is below a predetermined degree to prevent the heat transfer medium from cooling down the engine cylinder.

As the heat transfer medium is circulated in the circulating path 12, it transfers heat generated by the engine 2 to the thermal load. More specifically, the heat transfer medium is conveyed to the oil heat exchanger 5 in the oil pan 4 where it cools down the oil or draws heat from the oil of the engine 2. The heat transfer medium receiving thermal energy at the oil heat exchanger 5 and the exhaust gas heat exchanger 9 and having a higher temperature is further passed through the conduits in the cylinder wall and the cylinder head 6 or the cooling unit of the engine 2 in the form of a water jacket 6A and its temperature rises up.

A couple of temperature sensors TW1 and TW2 are provided across the circulation conduit 12 for measuring the temperature of the heat transfer medium. The temperature sensor TW1 is located close to the heat source or engine 2 while the temperature sensor TW2 is located at the downstream of the temperature sensor TW1. The two temperature sensors TW1 and TW2 can detect the present, absence, or shortage of the heat transfer medium in the circulation conduit 12. Their location and function will be described later in more detail.

Figure 2:
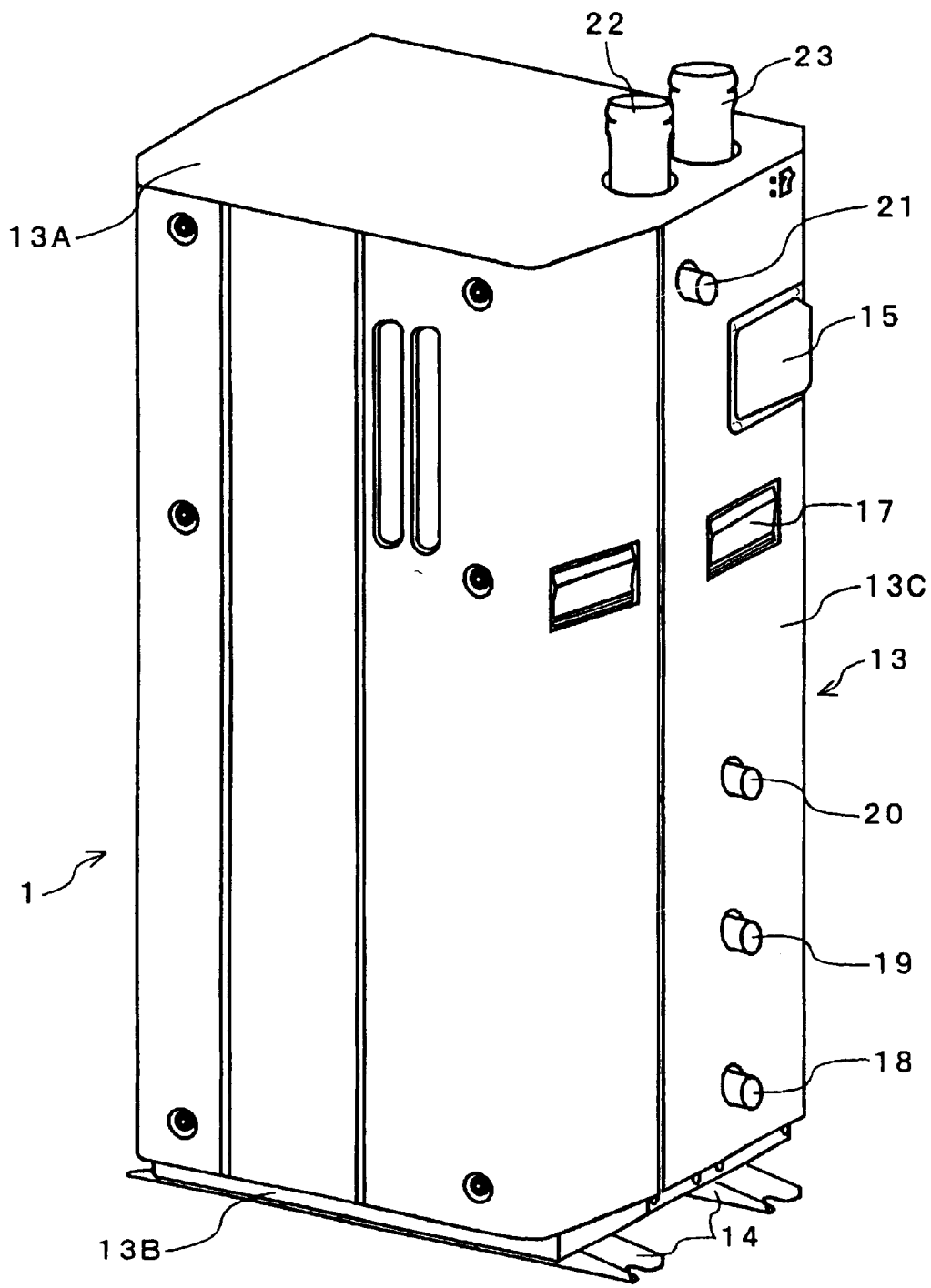
FIG. 2 is an external right perspective view of the engine waste heat recovering apparatus.
Figure 3:
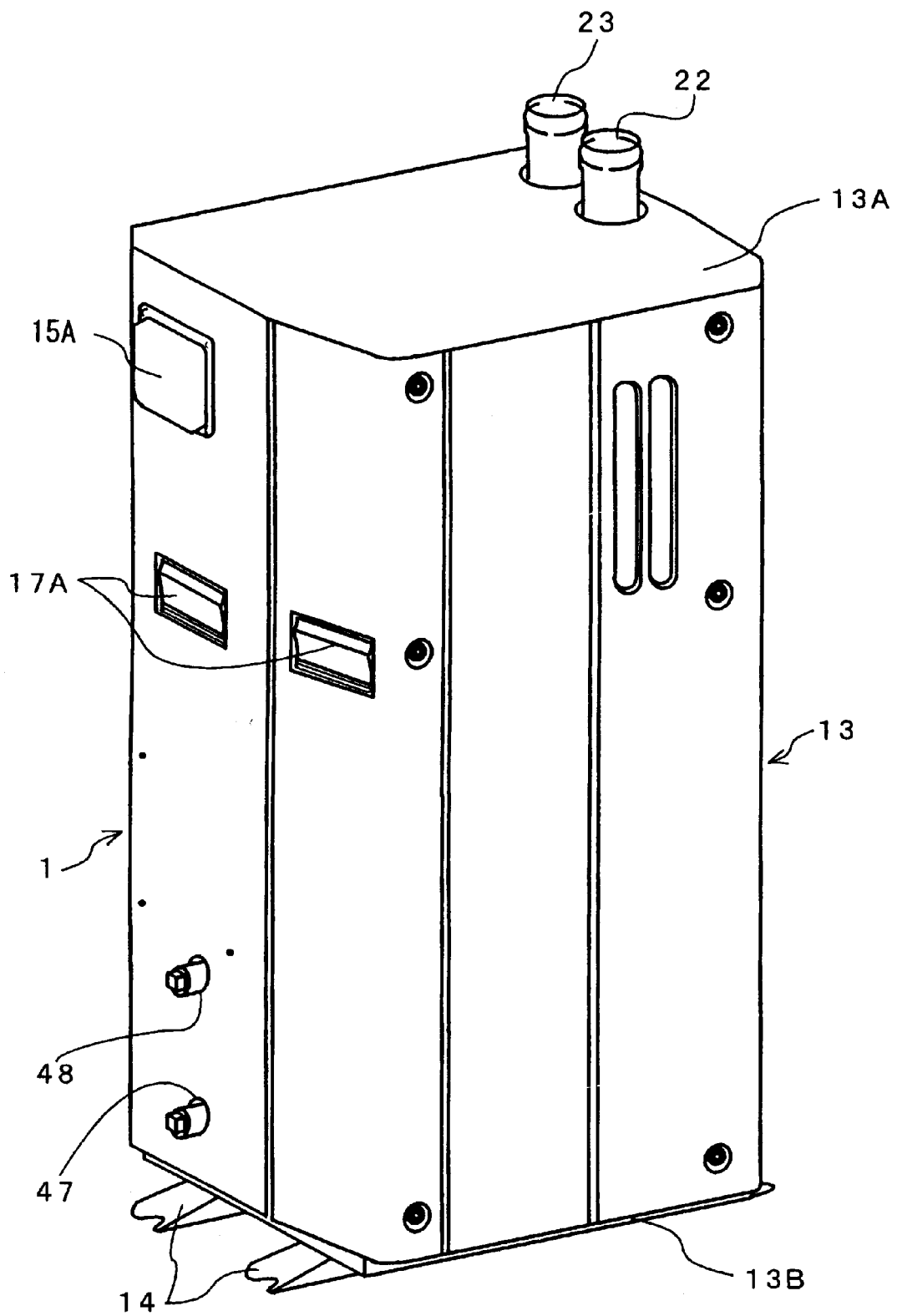
FIG. 3 is an external left perspective view of the engine waste heat recovering apparatus.

FIG. 2 is a right side perspective view showing an external of the waste heat recovering apparatus and FIG. 3 is a left side perspective view of the same. As shown in FIGS. 2 and 3, the waste heat recovering apparatus 1 is installed in a soundproof casing 13 which comprises a top plate 13A, a bottom plate 13B, and a side plate 13C. The bottom plate 13B is equipped with legs 14 and the side plate 13C has an electrical input/output terminals board 15 and grips 17 provided on the right side thereof. The side plate 13C also has openings provided in the right side thereof through which a heat transfer medium input pipe 18, a heat transfer medium output pipe 19, a condensed water drain pipe 20, and a fuel gas input pipe 21 extend. The top plate 13A has openings provided therein through which an air intaking pipe 22 and an exhaust pipe 23 extend.

Also, an input control panel 15A and grips 17A are provided on the left side of the side plate 13C. The side plate 13C has opening provided in the left side thereof through which a heat transfer medium left input pipe 47 and a heat transfer medium left output pipe 48 extend for connection with the heat transfer medium input pipe 18 and the heat transfer medium output pipe 19 respectively. The heat transfer medium input pipe 18 and the heat transfer medium left input pipe 47 are connected to unshown tubes for input of the heat transfer medium at either side of the casing 13 while the heat transfer medium output pipe 19 and the heat transfer medium left output pipe 48 are connected to unshown tubes for output of the heat transfer medium. In this embodiment shown in FIG. 3, the heat transfer medium left input pipe 47 and the heat transfer medium left output pipe 48 are plugged off because the heat transfer medium is input and output at the right side of the waste heat recovering apparatus 1.

Figure 4:
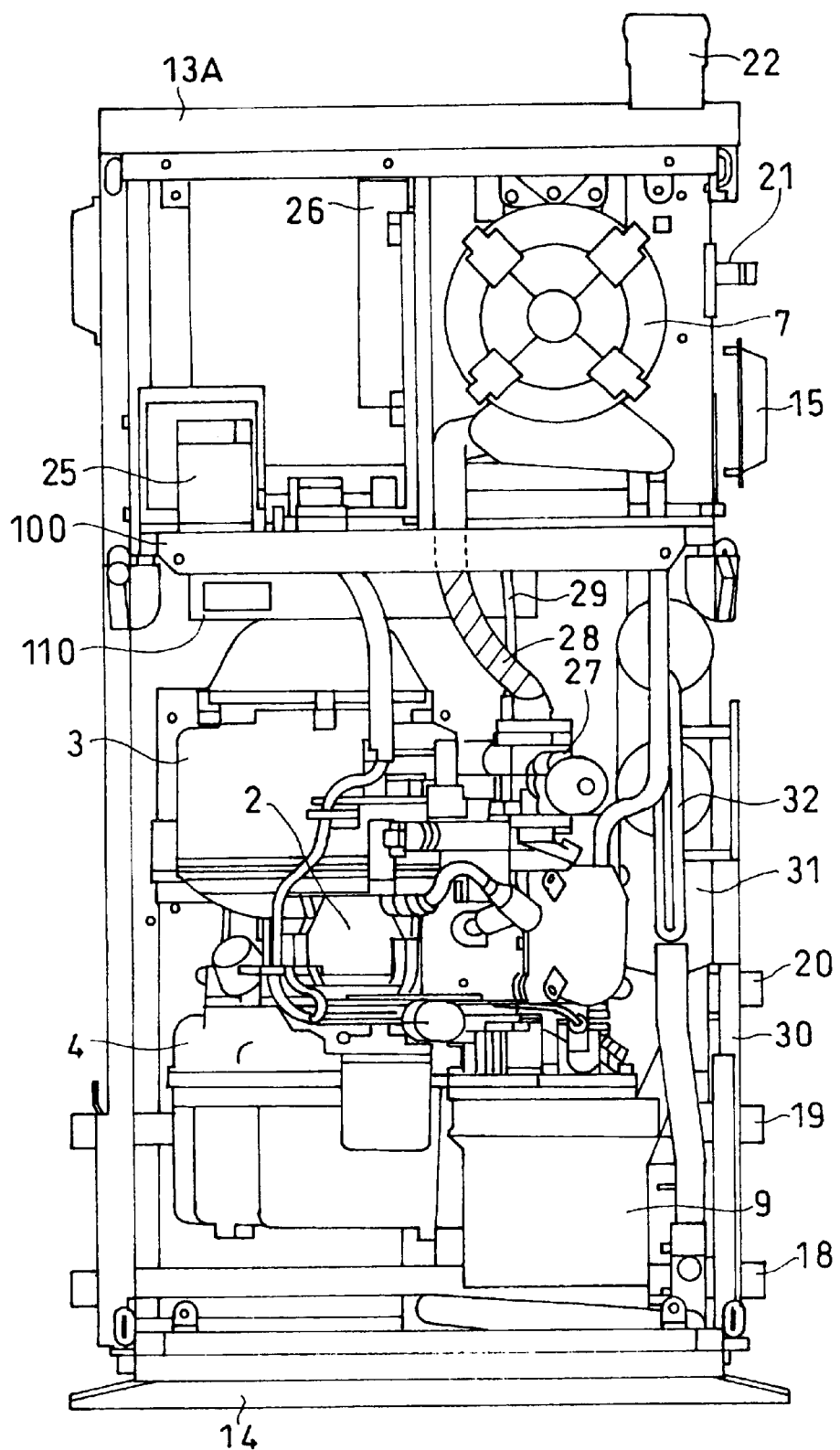
FIG. 4 is a front view of the engine waste heat recovering apparatus with its cover removed off.
Figure 5:
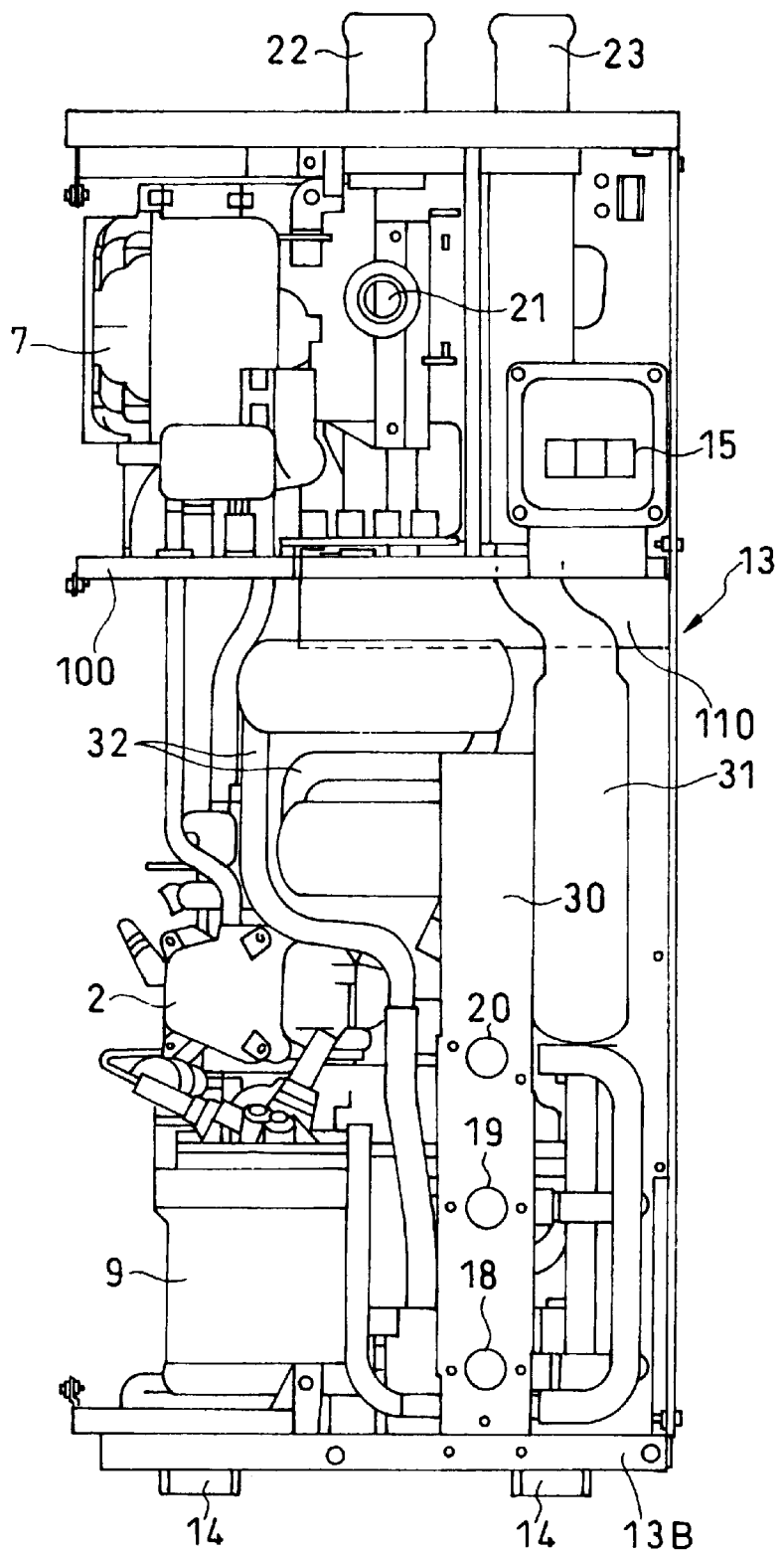
FIG. 5 is a right side view of the engine waste heat recovering apparatus with its cover removed off.
Figure 6:
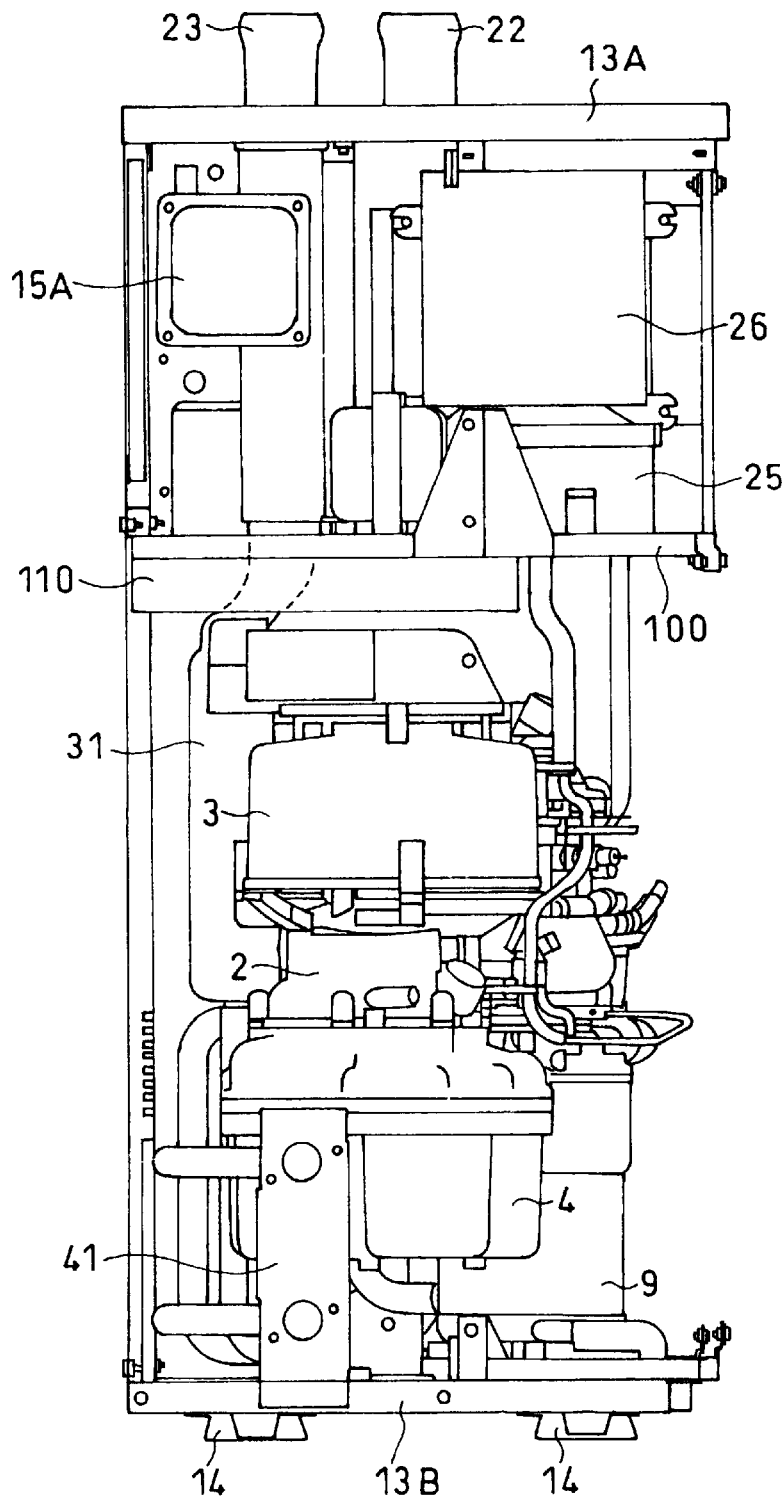
FIG. 6 is a left side view of the engine waste heat recovering apparatus with its cover removed off.

Interior construction of the waste heat recovering apparatus is further explained. FIG. 4 is a front view of the waste heat recovering apparatus with its cover partially removed and FIG. 5 and FIG. 6 are side view of the same seen from the right and left respectively. As shown in FIGS. 4 through 6, the air filter 7, a battery 25, an ECU 26, automatic voltage regulator (AVR), and pressure regulator of the fuel gas (both are not shown) et cetera are located at an upper region, the exhaust gas heat exchanger 9 at a lower region, and the engine 2 at an intermediate region of the waste heat recovering apparatus 1, respectively.

The engine 2 is of a vertical type where its crank shaft (not shown) is vertically elongated and connected to the power generator 3. The oil pan 4 is located beneath the engine 2. A mixer 27 is mounted above the cylinder head of the engine 2 and connected to an air intake hose 28 extending from the air filter 27 and a gas pipe 29 extending from a fuel gas inlet pipe 21 via the pressure regulator.

A right side stay 30 is mounted upright on the bottom panel 13B to extend along the side panel 13C. The stay 30 has joints 34, 44 and 38 (described later in more detail) which are provided with the heat transfer medium inlet pipe 18, the heat transfer medium outlet pipe 19, and the condensed water drainpipe 20, respectively. The silencer 31 extends along the right side stay 30 for absorbing noises of the exhaust gas released from the exhaust gas heat exchanger 9. The silencer 31 is communicated to the exhaust tube 23 while the air intake tube 22 is communicated to the air filter 7. The silencer 31 is joined at its inlet with a bent tube 32 for introducing the exhaust gas from the exhaust gas heat exchanger 9 into the interior of the silencer 31.

While the engine 2 is set vertically and linked at its vertically extending crank shaft to the actuator or power generator 3, the waste heat exchanger 9 is disposed beneath the horizontally extending cylinder of the engine 2. This allows the waste heat recovering apparatus 1 to extend vertically, thus contributing to the minimum size of the installation area. Also, this allows an ventilator device 110 provided under a partition 100 to operate effectively with the use of natural flows of the air. The ventilator device 110 has a labyrinthine structure for discharging the air taken through an air inlet in a bottom plate 13B of the soundproof casing 13 to the outside of the soundproof casing 13.

Figure 7:
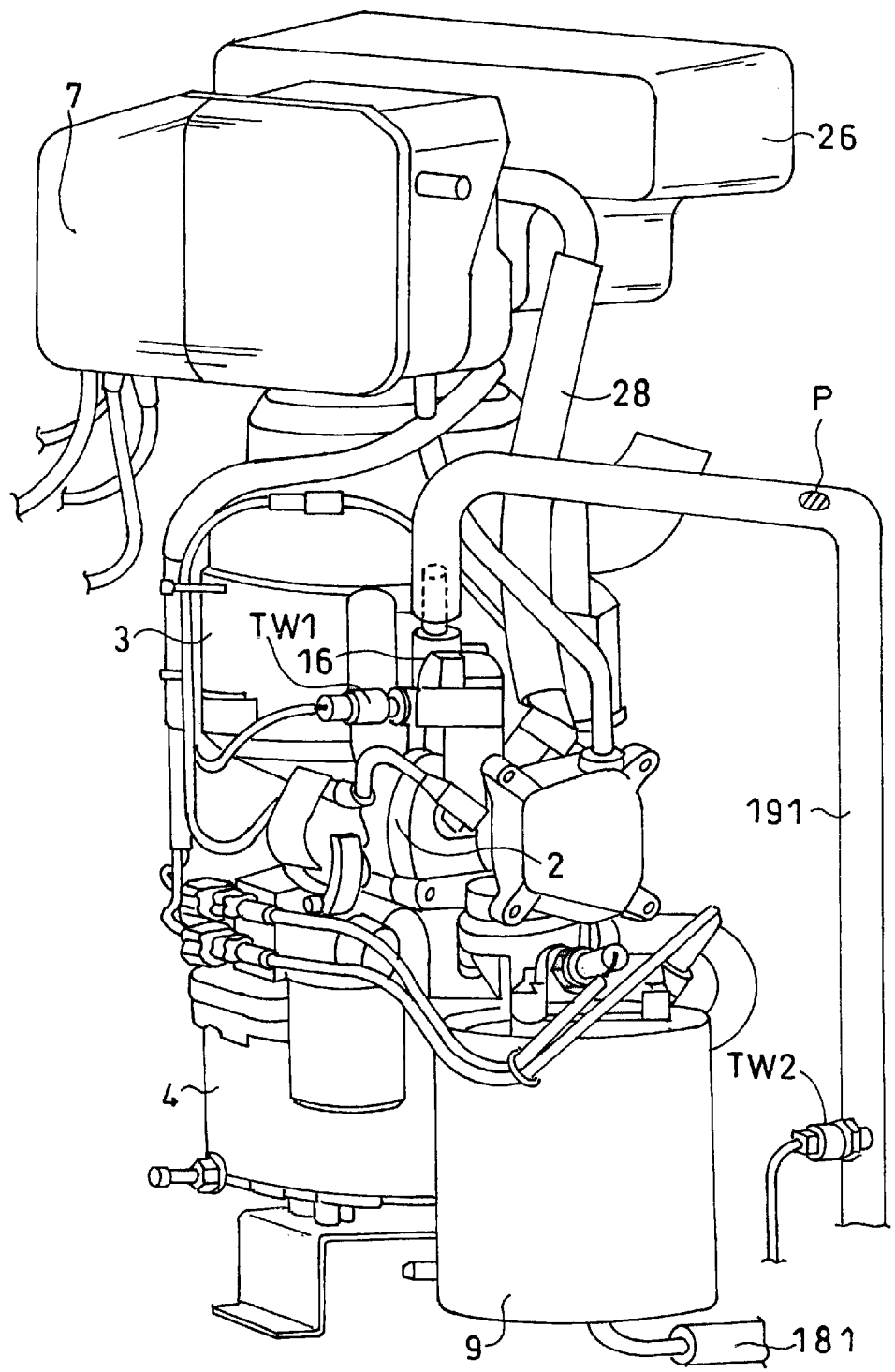
FIG. 7 is an enlarged perspective view showing the main portion of the waste heat recovering apparatus.

FIG. 7 is a perspective enlarged view of the waste heat recovering apparatus 1 where like components are denoted by like numerals as those shown in FIGS. 1 to 6. As shown in FIG. 7, the heat transfer medium or cooling water is introduced into the waste heat exchanger 9 from a pipe 181 connected to the heat transfer medium input pipe 18. A thermo cover 16 is provided adjacent to the cylinder head 6 of the engine 2 in the heat transfer medium circulation route and connected to a pipe 191 which is in turn linked to the heat transfer medium output pipe 19. The heat transfer medium fed into the waste heat exchanger 9 is conveyed in the circulation route 12 explained using FIG. 1. More specifically, the heat transfer medium is passed through the cylinder head 6 of the engine 2 and returned via the thermo cover 16, the pipe 191, and the heat transfer medium output pipe 19 to an external thermal load (e.g. a hot water supply reservoir).

The two temperature sensors TW1 and TW2 are provided across the heat transfer medium circulation route between the engine 2 and the heat transfer medium output pipe 19 for measuring the temperature of the heat transfer medium. More particularly, the temperature sensor TW1 is located at the upstream of the cylinder head 6 or the thermal cover 16 adjacent to the heat source while the other temperature sensor TW2 is located at the downstream of the pipe 191 or close to the heat transfer medium output pipe 19. A difference of the temperature between the two locations is measured and used with an algorithm, which will be described later, for examining whether the amount of the heat transfer medium in the circulation route 12 is adequate or not. The temperature sensors TW1 and TW2 are not limited to their locations shown in FIGS. 1 and 7. It is sufficient when the temperature sensor TW1 is located close to the heat source or the engine 2 and the temperature sensor TW2 is distanced from the sensor TW1 and at the downstream in the circulation route 12.

Figure 8:
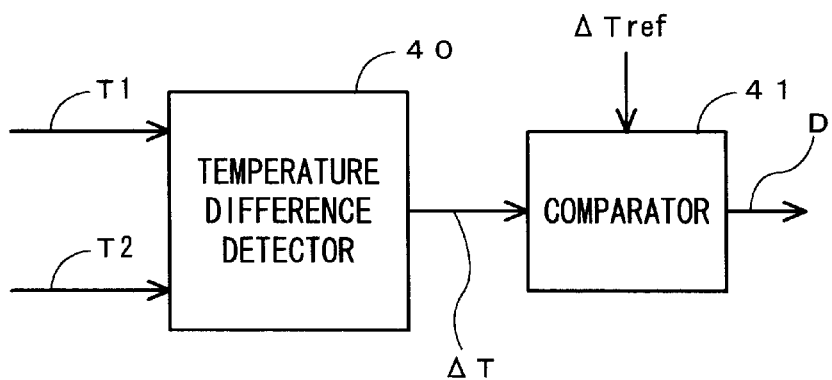
FIG. 8 is a block diagram showing a primary part of the function for examining if the heat transfer medium is presence or not.

FIG. 8 is a block diagram showing the function of examining from the measurements of the temperature sensors TW1 and TW2 whether the amount of the heat transfer medium is adequate or not. The function can be implemented by a microcomputer. The two outputs T1 and T2 which are analogue value from the temperature sensors TW1 and TW2 are converted into digital value and transferred to a temperature difference detector 40 where a difference $\Delta T$ between the two outputs T1 and T2 is calculated. The temperature difference $\Delta T$ is then received by a comparator 41 where it is compared with a reference temperatured difference $\Delta Tref$. When the temperature difference $\Delta T$ is greater than the reference level $\Delta Tref$, the comparator 41 provides a detection signal D (a heat transfer medium shortage signal). In response to the detection signal D, the action of the engine 2 can be canceled or the alarm for informing the occurrence of a fault can be emitted.

Figure 9:
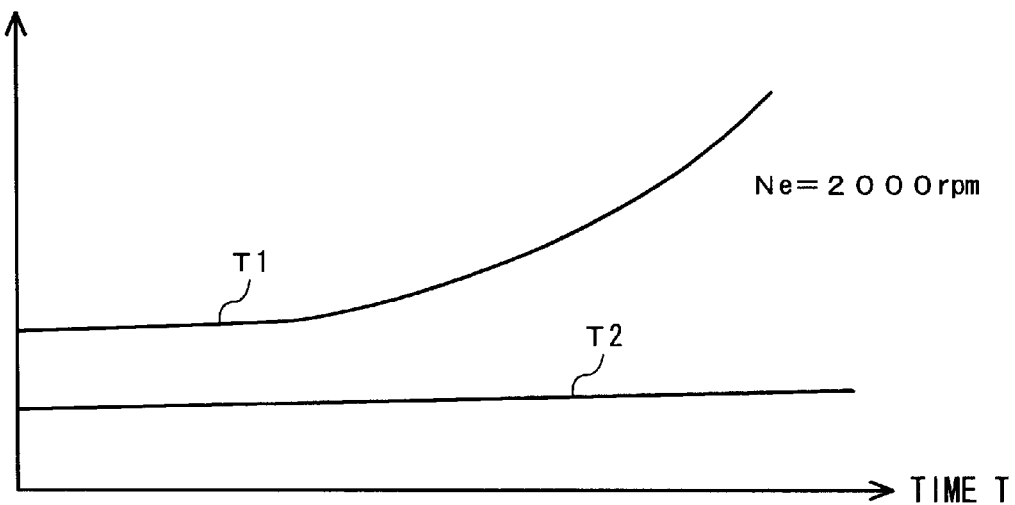
FIG. 9 is a diagram showing a change of the detected output provided with the temperature sensor.

FIG. 9 is a diagram showing profiles of the two outputs T1 and T2 of the temperature sensors TW1 and TW2 with the heat transfer medium not circulated. It is assumed that the number of engine revolutions Ne is constantly 2000 rpm. As apparent, the difference between the two outputs T1 and T2 will increase with time t. This may be explained by the fact that when the heat transfer medium or cooling water is absent, the heat is conducted through the air of which the thermal conductivity is lower than that of the cooling water. In other words, even if the temperature soars at the temperature sensor TW1 close to the outlet of the engine 2, the increase of the temperature at a location distanced from the heat source or engine 2 remains low.

When the heat transfer medium is present but not abundant in the circulation route 12, the temperature difference $\Delta T$ will hardly be increased thus elongating the period of time before it exceeds the reference difference level $\Delta Tref$. It is hence desirable for detection of the shortage of the heat transfer medium within a short period of time to locate the two temperature sensors TW1 and TW2 at specific locations in the circulation route 12 where the air easily stands still. This retards the time for conducting the heat between from one of the two temperature sensors to the other and can quickly increase the temperature difference $\Delta T$. As a result, the shortage of the heat transfer medium can be detected without delay.

This arrangement for determining the location of each temperature sensor is more effective when the thermal load is large and the energy of heat transmitted from the engine 2 to the sensors is increased. It is not mandatory to locate both the temperature sensors TW1 and TW2 at the location where the air easily stands still. The two temperature sensors TW1 and TW2 may be located so that at least one of them becomes not in direct contact with the heat transfer medium when the amount of the heat transfer medium is declined. For example, the other temperature sensor TW2 may be located at the position P shown in FIG. 7. The air can first be accumulated at upper portion of the pipe 191 other than anywhere else when the amount of the heat transfer medium is decreased.

It is also not necessary to have the temperature sensors TW1 and TW2 provided only for detecting the amount of the heat transfer medium. They can be replaced by temperature sensors provided general-use for controlling the temperature of the heat transfer medium in the waste heat recovering apparatus 1. Also, while the temperature sensors TW1 and TW2 are not provided only for detecting the amount of the heat transfer medium, their function may be implemented by two other temperature sensors provided commonly for fail-safe system or any other purpose.

For example, when a single temperature sensor is provided for measuring the heat transfer medium and fails to generate a correct detection signal, its action will hardly be judged in the correctness. Two or more temperature sensors are thus provided for the fail-safe system where the action of the system is stopped when any of the temperature sensors measures an abnormal level of the temperature. Those sensors for fail-safe system can preferably be used as the temperature sensors TW1 and TW2. As no extra sensors are required, the detection whether the amount of the heat transfer medium is adequate or not in the circulation route 12 can be conducted with less cost.

As set forth above, the present invention defined in claims 1 to 4 allows the predetermined threshold temperature for use to determine whether the difference in the temperature measurement between the first temperature sensor and the second temperature sensor is adequate or not to be set to a level slightly higher than the difference measured at the normal operation. Accordingly, the time lag prior to the detection of a fault will be shortened thus contributing to the protection of each component located adjacent to the engine.

As defined in claim 3, the first sensor and the second sensor are arranged in a combination to measure through a mass of the air the amount of the heat transfer medium which is probably insufficient. Accordingly, the shortage of the heat transfer medium can favorably be detected.

As defined in claim 3, the temperature sensors for the fail-safe system are utilized for measuring the amount of the heat transfer medium. It can thus be judged that the heat transfer medium is sufficient or not in the amount with no use of extra temperature sensors.

What is claimed is:

1. A waste heat recovering apparatus for recovering the waste heat of an engine by circulating a heat transfer medium through a water jacket to cool the engine, said apparatus comprising:

a first temperature sensor provided at a waste heat recovering location across the circulation path of the heat transfer medium;

a second temperature sensor provided downstream of the first temperature sensor across the circulation path; and a means for providing a heat transfer medium shortage signal when a difference in the temperature measurement between the first temperature sensor and the second temperature sensor is greater than a predetermined reference level.

2. A waste heat recovering apparatus for an engine according to claim 1, wherein the heat transfer medium is further conveyed to an exhaust gas heat exchanger which receives heat from the exhaust gas of the engine.

3. A waste heat recovering apparatus for an engine according to claim 1 or 2, wherein at least either the first temperature sensor or the second temperature sensor is placed at a location where the air tends to stagnate in the circulation path.

4. A waste heat recovering apparatus for an engine according to claim 1, wherein the first and second temperature sensors are a couple of temperature sensors provided in a fail-safe system.

* * * * *